United States Patent [19]
Temmerman

[11] 4,341,184
[45] Jul. 27, 1982

[54] METHOD AND DEVICE AVOIDING THE POLLUTION OF THE ATMOSPHERE BY NOXIOUS GASES

[76] Inventor: Maria Temmerman, 3, Rue Belliard, 1000 Bruxelles, Belgium

[21] Appl. No.: 60,116

[22] Filed: Jul. 23, 1979

Related U.S. Application Data

[63] Continuation-in-part of Ser. No. 646,774, Jan. 6, 1976, abandoned, which is a continuation-in-part of Ser. No. 580,459, May 23, 1975, abandoned.

[51] Int. Cl.³ ............................................. F02D 19/00
[52] U.S. Cl. .............................. 123/25 F; 123/25 D; 123/DIG. 12
[58] Field of Search ................... 123/3, DIG. 12, 525, 123/25 D, 25 E, 25 F, 25 P

[56] References Cited
U.S. PATENT DOCUMENTS

| | | | |
|---|---|---|---|
| 1,966,345 | 7/1934 | Harrell | 123/3 |
| 2,509,498 | 5/1950 | Heyl | 123/525 |
| 3,653,364 | 4/1972 | Bogan | 123/3 |
| 3,717,129 | 2/1973 | Fox | 123/3 |
| 3,906,913 | 9/1975 | Rupe | 123/525 |
| 3,939,806 | 2/1976 | Bradley | 123/DIG. 12 |
| 4,003,343 | 1/1977 | Lee | 123/3 |
| 4,121,543 | 10/1978 | Hicks | 123/3 |

Primary Examiner—Ronald H. Lazarus
Attorney, Agent, or Firm—Nolte & Nolte

[57] ABSTRACT

The formation of noxious exhaust gases is prevented in internal combustion engines by passing steam in contact with an element comprising cerium and germanium and then to a location at which the formation of the noxious gases would normally take place.

12 Claims, 6 Drawing Figures

METHOD AND DEVICE AVOIDING THE POLLUTION OF THE ATMOSPHERE BY NOXIOUS GASES

This is a continuation-in-part of abandoned application Ser. No. 646,774 filed Jan. 6, 1976, which was a continuation-in-part of application Ser. No. 580,459 filed May 23, 1975 and now abandoned.

The present invention relates essentially to a method and a device for avoiding the pollution of the atmosphere by noxious gases such as nitrogen oxides, carbon monoxide, unburnt hydrocarbons and petroleum gases, and sulphur dioxide.

This problem assumes particular importance nowadays and a great number of attempts have been made to reduce or eliminate such noxious gases which are present in the gases, smoke or fumes rejected to the atmosphere by factory chimneys or stacks, the exhaust systems of internal combustion engines of automotive vehicles and so forth.

A great number of methods and devices are already known which are intended to purify or cleanse the exhaust gases of internal combustion engines. However, these means are not entirely satisfactory, for on the one hand, they are often complex, expensive and insufficiently reliable and, on the other hand, they do not allow the nitrogen oxides, the carbon monoxide and the other noxious gases to be completely eliminated from the exhaust gases.

Moreover, most of these known means are intended to eliminate or decompose the noxious gases, but not to prevent their formation.

Lastly, these known means are difficult to be used for cleaning the gases, smoke or fumes rejected to the atmosphere by the factory chimneys or stacks.

The purpose of the present invention is precisely to palliate the drawbacks to the known means, owing to a method and a device which are extremely simple, inexpensive and reliable.

To this end, the invention provides a method for avoiding the pollution of the atmosphere by noxious gases, more particularly by the exhaust gases of internal combustion engines, which is characterized in that it consists in preventing the formation and/or effecting the decomposition, by means of steam, of noxious gases such as carbon monoxide, nitrogen oxides, sulphur dioxide and unburnt hydrocarbons by causing the steam to pass on an element comprising cerium or germanium and by supplying this steam at the location where the formation of the noxious gases takes place, for example by introducing it into the air-intake manifold of the engine.

According to still another feature of the invention, the method consists in preventing the formation and/or effecting the decomposition of the noxious gases by means of hydrogen produced by the decomposition of steam by cerium or by germanium.

Indeed, it has been observed that there is a complete absence of nitrogen oxides and carbon monoxide in the exhaust gases rejected to the atmosphere, when the steam introduced for example into the intake manifold, passes also on a compound comprising cerium or germanium before penetrating into the engine cylinders where the combustion and therefore the formation of nitrogen oxides, carbon monoxide, unburnt hydrocarbons and sulphur dioxide takes place.

Thus, the greatest risks of pollution of the atmosphere by noxious gases are eliminated in an extremely simple manner and with inexpensive means.

A corollary advantage of the invention is that the combustion of a fuel mixture takes place more efficiently, that a small but real reduction in fuel consumption is observed, that simultaneously the formation of carbon deposits or soot is avoded and that the power delivered by the engine is slightly increased.

According to still another feature of the method according to the invention, steam is caused to pass on an element containing from 0.5 to 100% cerium and preferably from 36 to 40% cerium, or containing from 48 to 50% germanium.

The invention also relates to apparatus for carrying out the method according to the invention, comprising a conduit, duct, line or the like in which flows a gas mixture liable to comprising the aforesaid noxious gases or from which the aforesaid noxious gases are produced, the device also including means for introducing steam into the conduit and at least one element comprising cerium or germanium arranged in the passageway for the steam.

According to still another feature of the invention, the apparatus forms an intake system for an internal combustion engine, e.g. of an automotive vehicle, comprising an air filter and an intake manifold leading to the engine cylinders, in which the means for introduction of steam open into the manifold or the air filter.

The invention will be better understood and other purposes, details, features and advantages of the invention will appear more clearly as the following explanatory description proceeds with reference to the appended diagrammatic drawings given solely by way of example illustrating various embodiment of the invention and wherein.

Figure 1:
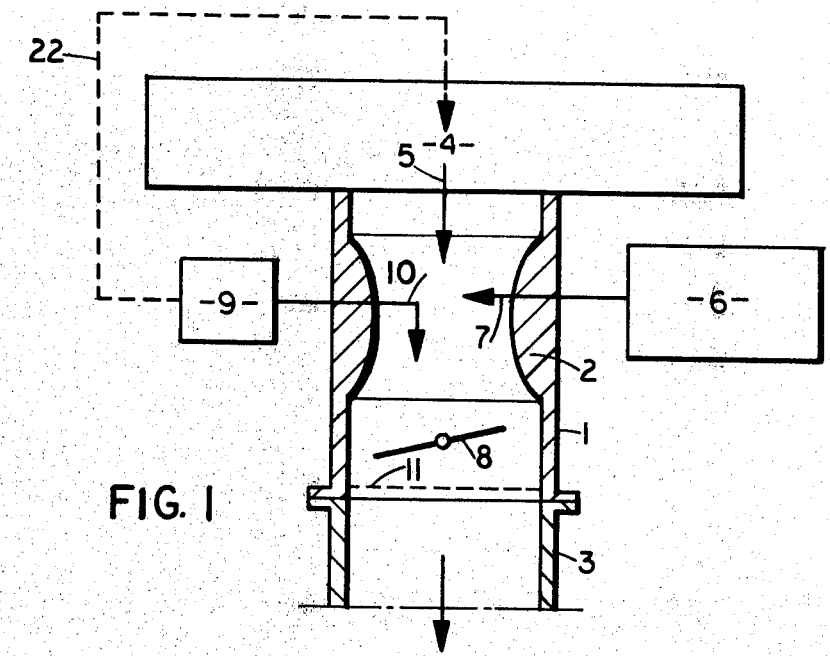
FIG. 1 is a diagrammatic sectional view of an internal-combustion-engine intake manifold provided with apparatus according to the invention.

In FIG. 1 is therefore illustrated the application of the method and device according to the invention to the intake system of an internal combustion engine, e.g. for an automotive vehicle.

The intake system comprises, in a manner known per se, a conduit 1, the internal wall of which is provided with a venturi 2 and which forms the inlet of the intake manifold 3 of the internal combustion engine. The inlet of the conduit 1 is provided at its top with an air filter 4, and the engine supply air therefore penetrates through this air filter into the venturi 2 and flows in the direction indicated by arrow 5.

A carburetor 6 conventionally supplied with liquid fuel such as gasoline is arranged in immediate proximity to the conduit 1 and sends into the venturi 2 thereof liquid fuel atomized into fine droplets by a jet (not shown). The arrow 7 indicates the intake of the atomized fuel into the venturi 2 of the conduit 1.

The intake system also comprises a gas throttle 8 arranged downstream of the venturi 2 and allowing the flow of supply air and atomized fuel mixture towards the cylinders to be adjusted.

According to the invention, the intake system also comprises means 9 for the introduction of steam into the venturi 2, as indicated by arrow 10, or upstream of the latter, as indicated at 22. A grate or other element 11 of cerium or of a compound comprising cerium is arranged downstream of the venturi 2, for example at the very inlet of the intake manifold 3, so that the mixture of supply air, of atomized fuel and of steam sucked into the intake manifold 3 passes through the grate 11.

Means are provided to allow the introduction of steam into the venturi 2 or into the air filter 4 depending upon the running speed of the engine, for example in the same manner as the carburetor 6 allows the fuel intake into the venturi 2 to be adjusted.

Figure 2:
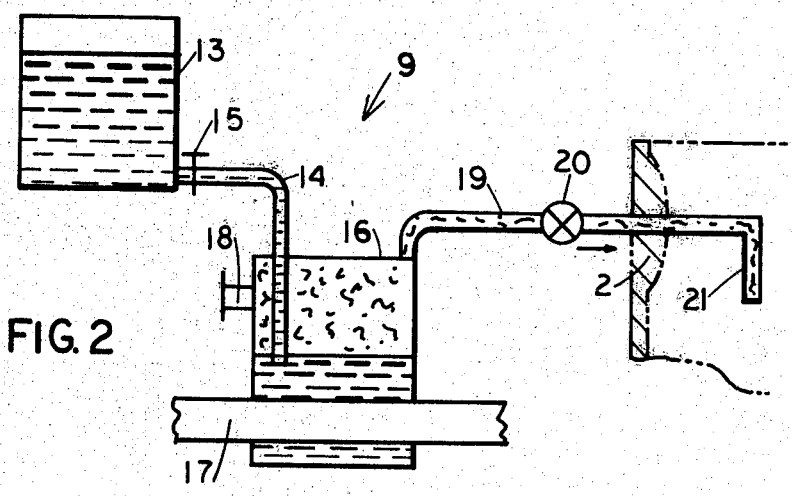
FIG. 2 is a more detailed view of the means for introduction of steam included in the device shown in FIG. 1.

In FIG. 2 is shown and embodiment of the means for steam supply into the conduit 2.

These means comprise essentially a sealingly closed water tank 13 connected through a dip tube 14 provided with a cock 15 with the internal space of a heat exchanger 16 in contact with the exhaust pipe or pipes 17 of the engine. The heat exchanger 16 is provided with an air inlet 18 and a steam outlet pipe 19 which opens into the internal space of the air intake manifold 1 through a nozzle or injector 21 extending within the manifold lengthwise and in the air flow direction 5.

This device operates as follows:

The arrangement of the closed tank 13 above the heat exchanger 16 ensures a substantially constant level of the water in the exchanger and an automatic replacement of the amount of water converted into steam through heat exchange with the exhaust gases passing in the pipe 17. The lengthwise arrangement of the nozzle or injector 21 in the air intake manifold ensures that the rate of flow of the steam admitted into the manifold as a result of suction by the flow of air shall depend upon the rate of flow of the air admitted into the cylinders, thus resulting in automatic control and regulation of the amount of steam admitted into the manifold according to the various running speeds of the engine.

The steam flow can be originally adjusted by suitably selecting the dimensions of the pipe 19 and the injector 21, or by means of a valve 20 mounted on the pipe 19 upstream of the air intake manifold inlet.

The supply air, the atomized fuel and the steam introduced into the venturi 2 are sucked into the intake manifold 3 and thus flow through the grate 11 of cerium or germanium. This mixture is thereafter distributed into the various engine cylinders in order to be burned therein in the conventional manner, the combustion gases produced being thereafter rejected to the atmosphere by the exhaust system of the engine.

It will be noted the means 9 allowing steam to be introduced into the engine may be connected directly through the air filter 4 through a conduit 22, as shown in dotted lines in FIG. 1, used instead of the conduit 10 opening into the venturi 2.

Also, use can be made, instead of the grate 11, of a twisted wire or thread of cerium or containing cerium, which will be arranged either in the conduit 10 or in the conduit 22 and which will thus be readily replaceable when worn. Indeed, it has been observed that the cerium or the germanium used slowly disappears during the operation of the engine.

It has also been observed that the same result was obtained by using germanium instead of cerium. In any case, use can be made of either pure cerium or pure germanium, or a compound or an alloy containing from 0.5 to 100% cerium, and preferably from 36 to 40% cerium, or a compound or an alloy containing from 45 to 80% germanium preferably, the rest of the alloy or the compound being constituted for example by iron.

Figure 4:
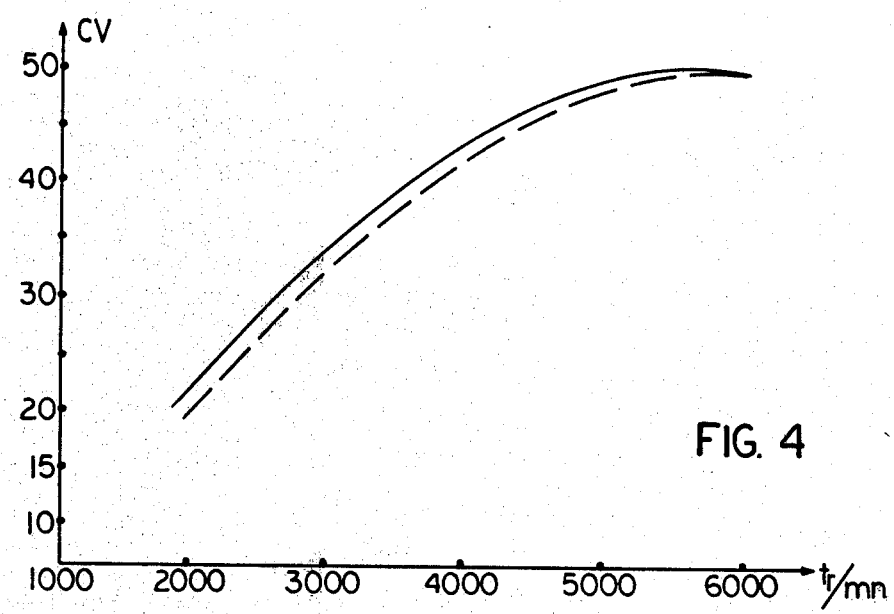
FIGS. 4, 5 and 6 are graphs illustrating the influence of the method according to the invention on the power of an internal combustion engine, on its specific consumption and on the percent contents of noxious compounds in the exhaust gases.
Figure 5:
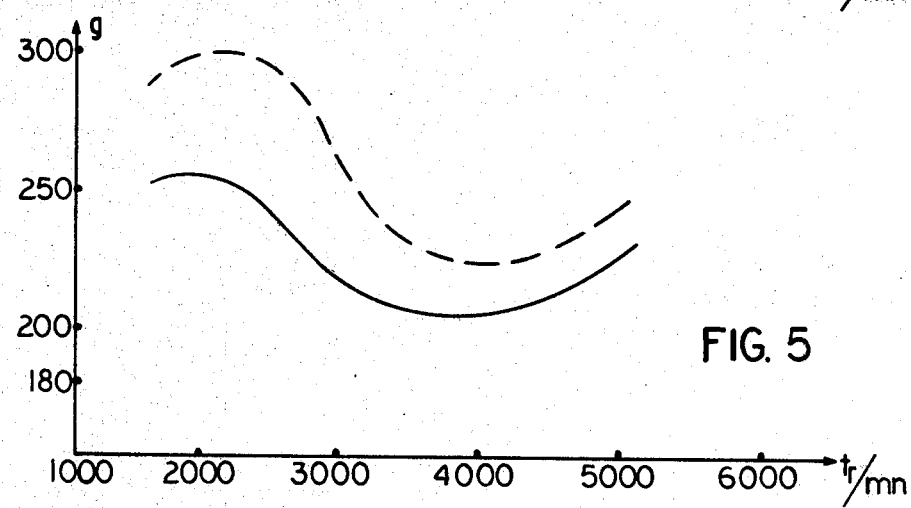
Figure 6:
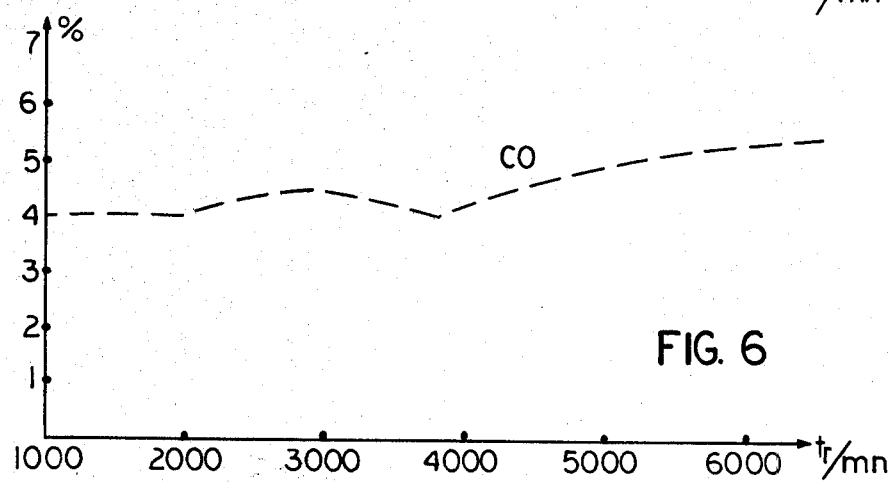

The results provided by the method and the device according to the invention has been diagrammatically illustrated in FIGS. 4, 5 and 6, in comparison with the results provided by the known prior devices. In all three figures, the curves obtained in an engine equipped with the device according to the invention are shown in full lines whereas the curves obtained with an engine of the prior art, not equipped with the device of the invention, are shown in dotted lines.

FIG. 4 shows the horsepower delivered by an engine as a function of its running speed (in r.p.m.)

FIG. 5 shows the specific consumption (in grams) as a function of the running speed of the engine (in r.p.m.).

Lastly, FIG. 6 shows the percent content of carbon monoxide in the engine exhaust gases as a function of the running speed of the engine (in r.p.m.), that content being determined by analyzing the exhaust gases by gas chromatography. It is found that in an internal combustion engine which is not equipped with the device according to the invention the percent content of carbon monoxide varies between 4 and 5.5% depending upon the running speed of the engine, whereas absolutely no carbon monoxide content is found in the case of an engine equipped with the device according to the invention. Likewise, it has been found that the percent contents of the following gases: unburnt hydrocarbons, $NO+NO_x$, $SO_2$, which are generally comprise between 1 and 3%, of the exhaust are near to zero in the case of an internal combustion engine equipped with the device according to the invention.

The cerium or the germanium on which the steam passes causes a decomposition of the steam, as a result of which hydrogen is obtained, and it may be assumed that the hydrogen comprises nascent or atomic hydrogen. This results in preventing the formation or causing the decomposition of polluting compounds such as nitrogen oxides, carbon monoxide, unburnt hydrocarbons and sulphur dioxide, which generally are present in the combustion gases rejected to the atmosphere.

The method and device according to the invention can be used for internal combustion engines with a carburetor or with direct injection, for Diesel engines, turbine engines, turbo-jets, domestic heating and factory chimneys.

Figure 3:
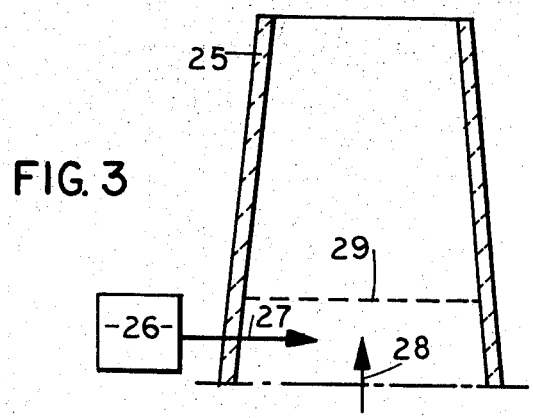
FIG. 3 is a diagrammatic sectional view of a factory chimney provided with the device according to the invention.

By way of example, FIG. 3 diagrammatically illustrates the application of the invention to the cleaning of gases or fumes rejected to the atmosphere by a factory chimney.

The chimney 25 is provided with means 26 allowing steam to be conveyed, through conduit 27, into the chimney. The gases or fumes rejected by the chimney mix with steam at 28 and pass through a grate 29 of cerium or germanium or a compound or alloy containing cerium or germanium, which is arranged downstream of the point at which the conduit 27 introduces steam into the chimney. It is also possible to place, within the conduit 27 for the introduction of steam, a twisted wire of cerium of germanium or of an alloy containing cerium or germanium. It has been observed that by means of such a plant it is possible to reduce to a great extent and practically eliminate the carbon monoxide and the nitrogen oxides present in the gases and the fumes rejected to the atmosphere, as well as fluorine and fluorine-containing compounds, sulphur dioxide, and so forth.

It will also be noted that the introduction of steam, in association with its passage on cerium or germanium, can also advantageously be performed at the point of formation of the polluting compounds or slightly upstream of the point of formation.

It will also be observed that the cerium or germanium grate may be replaced by a coating or layer of cerium or germanium or a compound containing cerium or germanium on the walls of the conduit.

It will be noted that, in some cases, the steam used may be replaced by a suitable medium capable of producing hydrogen by simple decomposition.

Lastly, it has been observed that, in the case of an internal combustion engine, the best results are obtained when the idling needle of the carburetor is so adjusted as to form a poor fuel mixture and the adjustment of the power-jet remains normal. Therefore, this is not an impoverishment of the fuel mixture but an enrichment thereof, resulting in a better carburetion and combustion not only at the normal running speed of the engine but also at idling speed, in spite of the poor idling adjustment, this advantage being impossible to obtain without the apparatus according to the invention.

Of course the invention is by no means limited to the embodiments described and illustrated, which have been given by way of example only. In particular, it comprises all technical equivalents to the means described and illustrated as well as their combinations should the latter be carried out according to its gist and within the scope of the following claims.

What we claim is:

1. Apparatus for reducing the emission of pollutant gases resulting from a combustion of fuel in an internal combustion engine comprising means defining a path for the passage of fuel to a combustion zone, means for producing a stream of water vapor, said means comprising an exhaust pipe (17), a water reservoir (13) above said exhaust pipe, a heat exchanger (16) in contact with and completely surrounding the exterior periphery of said exhaust pipe, an air vent (18) for said heat exchanger, a water outlet (14) for said reservoir, projecting from the reservoir and extending into said heat exchanger, valve means (15) on said outlet for controlling the flow of water from said reservoir to said heat exchanger, and a conduit (22) for passing the steam produced in the heat exchanger into contact with a catalyst comprising cerium or germanium while maintaining the fuel out of contact with said catalyst, thereby producing nascent hydrogen by the contact of said water vapor with the catalyst, and a supplemental conduit for thereafter passing the stream of vapor into said path and delivering it with said fuel ro the combustion zone.

2. Apparatus according to claim 1, in which said catalyst comprises a grate arranged for passage of said water vapor stream therethrough.

3. Apparatus according to claim 1, in which said catalyst comprises a twisted wire arranged for passage of said water vapor stream in contact therewith.

4. Apparatus according to claim 1, further comprising a conduit for conducting said water vapor during the contact thereof with said catalyst and said catalyst comprises a coating on the internal walls of the conduit.

5. Apparatus according to claim 1, with an internal combustion engine including an air filter, in which combination the means for passing the resulting stream communicates with the air filter.

6. Apparatus according to claim 1 in combination with an internal combustion engine including an intake manifold, in which combination the means for passing the resulting stream communicates with the manifold.

7. Apparatus according to claim 1, further comprising a heat exchanger including means for conducting the gases resulting from the combustion in a hot condition from said combustion zone through said heat exchanger in heat exchanging relationship with said water thereby to convert said water to steam.

8. The combination according to claim 7, in which the engine also includes cylinders to which air is fed through said manifold and the means for passing the stream of water vapor comprises means for introducing the water vapor into the manifold in the direction of air flow in the manifold.

9. Apparatus according to claim 1, in which the internal combustion engine includes at least one combustion cylinder, means for introducing air into said cylinder and means for introducing vaporized water into said air before said air entrance into the cylinder, the flow rate of said vaporized water being changed by changing the flow rate of said air.

10. Apparatus according to claim 1, in which the catalyst comprises 0.5 to 100% cerium.

11. Apparatus according to claim 1, in which the catalyst comprises 36 to 40% cerium.

12. Apparatus according to claim 1, in which the catalyst comprises 45 to 80% germanium.

* * * * *

UNITED STATES PATENT AND TRADEMARK OFFICE
CERTIFICATE OF CORRECTION

PATENT NO. : 4,341,184
DATED : July 27, 1982
INVENTOR(S) : MARIA TEMMERMAN

It is certified that error appears in the above-identified patent and that said Letters Patent are hereby corrected as shown below:

In Column 6, line 6:

"ro" should read --to--.

Signed and Sealed this

Nineteenth Day of October 1982

[SEAL]

Attest:

Attesting Officer

GERALD J. MOSSINGHOFF

Commissioner of Patents and Trademarks